(12) United States Patent
Vuorinen

(10) Patent No.: US 6,189,191 B1
(45) Date of Patent: Feb. 20, 2001

(54) METHOD AND TOOL FOR ATTACHING TOOTH BIT

(75) Inventor: Markku Vuorinen, Tampere (FI)

(73) Assignee: Hackman TTT Oy AB, Toijala (FI)

( * ) Notice: Under 35 U.S.C. 154(b), the term of this patent shall be extended for 0 days.

(21) Appl. No.: 09/263,465

(22) Filed: Mar. 5, 1999

(30) Foreign Application Priority Data

Mar. 10, 1998 (FI) .......................................... 980540

(51) Int. Cl.[7] .................................................. B23P 19/04
(52) U.S. Cl. ................................................................ 29/267
(58) Field of Search ............................ 29/267, 270, 278; 81/485; 254/131.5, 25, 131

(56) References Cited

U.S. PATENT DOCUMENTS

| | | | |
|---|---|---|---|
| 2,049,489 | * | 8/1936 | Christen ................................ 29/267 |
| 3,097,547 | * | 7/1963 | Krekeler ................................ 29/267 |
| 3,769,683 | * | 11/1973 | Krekeler ................................ 29/267 |
| 4,999,898 | * | 3/1991 | Schmeling ............................ 29/267 |

\* cited by examiner

Primary Examiner—Robert C. Watson
(74) Attorney, Agent, or Firm—Alston & Bird LLP

(57) ABSTRACT

The invention relates to a method for attaching a tooth bit, according to which method the shapelocked tooth bit (4) is rotated into its seat (3). Rotating is arranged to occur in such a way that the tooth bit is mainly subjected to the rotational motion, but not to considerable upward or downward forces, which could damage the tooth bit. The invention further relates to a tool for attaching the tooth bit, which tool comprises means for turning the shapelocked tooth bit (4) into the bit seat (3) provided for attachment. In accordance with one preferred embodiment the tooth bit (4) is arranged to turn about the center of rotation (5) of the bit seat (3).

3 Claims, 5 Drawing Sheets

METHOD AND TOOL FOR ATTACHING TOOTH BIT

Figure 1A:
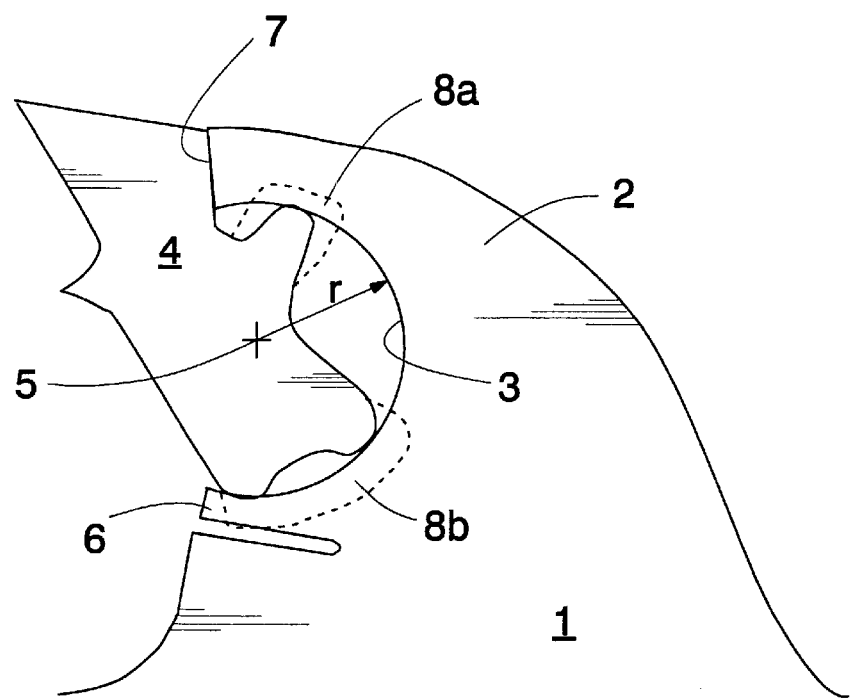

The invention relates to a method for attaching a tooth bit to a blade used in sawing, in which method a shapelocked tooth bit is arranged in a bit seat which is formed in a blade body and which is curved with respect to a center of rotation.

The invention further relates to a tool for attaching the tooth bit, the tool being intended for inserting the shapelocked tooth bit used in sawing into the bit seat which is formed in the blade body and which is curved with respect to the center of rotation.

Shapelocked, replaceable tooth bits are used, for instance, in circular saw blades employed in woodworking, as well as in band saw blades, handsaw blades, gang or bow saw blades and the like. Thanks to the shapelocked arrangement, tooth bits need not be brazed, riveted or installed in any other fixed manner to a blade body, but the tooth bits are firmly locked to place thanks to the tooth bit and the matching bit seat provided in the blade body. In principle, one advantage of the shapelocked arrangement over attachment by brazing, for instance, is that it is quick to carry out and tooth bits can be changed easily. Tooth bit attachment may take place on site, and it is not even necessary to detach the blade for replacing tooth bits. In practice, there is currently no suitable tool wherewith the shapelocked tooth bits could be inserted into their seats quickly, yet without damaging the tooth bit in any way. At present, tooth bits are attached in a fairly clumsy manner, for instance, by forcing them into their seats by means of various pliers or by tapping them to position with a hammer. It is obvious that this kind of insertion cannot be effective nor advantageous as regards the tooth bit. Since the tooth bit is generally made of the hardest possible material in view of its wear resistance, such as high-speed steel, hard metal, ceramic or some other suitable tooth bit material, the tooth bit does not stand such rough handling as described above, but due to its brittleness it breaks relatively easily. In addition, the pre-sharpened cutting edges of the tooth bit may be damaged when current insertion methods are employed.

The object of the present invention is to provide a method and a tool which avoid the drawbacks of the prior art and which enable efficient, and yet gentle, handling of the tooth bits.

The method of the invention is characterized in that the tooth bit is inserted into its seat by rotating it with respect to the seat with a tool which comprises at least two insertion heads arranged on the opposite sides of the tooth bit.

The tool in accordance with the invention is further characterized by comprising at least two insertion heads to be arranged against the tooth bit, the insertion heads being arranged on the opposite sides of the tooth bit, and means for exerting a turning force on the tooth bit by means of the insertion head, whereby the tooth bit is arranged to rotate into its seat.

The basic idea of the invention is that the tooth bit to be attached is mainly subjected to a rotational motion only, by which the tooth bit can be turned to a correct position in its seat where it is firmly held in place by means of the shapelocked arrangement. A further substantial point is that the tool has at least two insertion heads arranged on different sides of the tooth bit, which enable the tooth bit to be turned when the turning force is exerted thereon by means of the insertion heads. Further, the basic idea of one preferred embodiment of the invention is that the tooth bit is turned such that the center of rotation is substantially identical to the center of the circular bit seat formed in the blade body. The basic idea of a second preferred embodiment of the invention is that the tool, by means of its supporting means, bears against the blade body in such a way that a turning means mounted rotatably with bearings on the supporting means and acting on the tooth bit can thus be turned substantially with respect to the bit seat's center of rotation. Further, the basic idea of a third preferred embodiment of the invention is that the turning means, which turns the tooth bit, is arranged to turn with respect to the bit seat's center of rotation by means of an appropriate link mechanism. The basic idea of yet a fourth preferred embodiment is that the tool comprises a link mechanism or the like for increasing the force by which the tooth bit is turned when inserting.

The invention has an advantage that the tooth bit is almost only subjected to the rotational motion which is substantial to mounting, but not to considerable upward or downward forces, which could damage the tooth bit or the bit seat. When the forces used for mounting are exerted correctly, less force is needed than in previous solutions. On the other hand, the fit between the tooth bit and the bit seat formed in the blade body can be made tighter than before, and so the tooth bit can be attached more firmly than before, whereby it is prevented from vibrating or otherwise moving with respect to the blade body, which would have an adverse effect on the durability and sawing properties of the tooth bit. Additionally, firmer attachment enables in principle increased sawing efficiency. Furthermore, another advantage is that by means of the purpose-made tool the tooth bits can be inserted considerably quicker than before. The fact that bits will no longer get broken during insertion also contributes to the quickness. Thanks to quicker insertion, the blade can be quickly put back to productive use when necessary. Moreover, it is more convenient and easier than before to perform the insertion, and thus it is more likely that the tooth bits will be replaced as soon as a fault is noticed, and there will no longer be any temptation to saw with inefficient, dull or broken tooth bits which involve a risk of even greater damage. One more advantage is that the insertion tool in accordance with the invention has a surprisingly simple structure and operating principle, and consequently it is durable and inexpensive to manufacture. Moreover, it can be used under all conditions and irrespective of external driving force. In addition, it is so simple to use that it is practically impossible to use it incorrectly, and thus even a less experienced person can always insert the bits correctly.

Figure 1B:
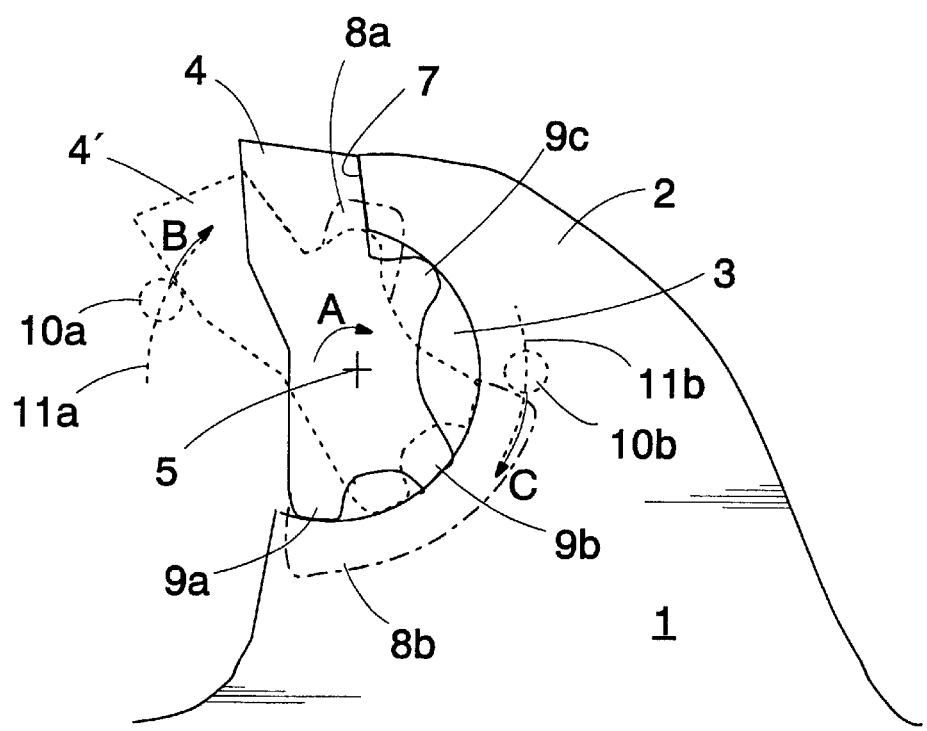

In the following, the invention will be described in greater detail with reference to the attached drawings wherein FIG. 1a is a schematic side view of a portion of a circular saw blade with a shapelocked tooth bit inserted into place, and FIG. 1b illustrates a general principle according to which the shapelocked tooth bit is mounted on a blade body.

Figure 2:
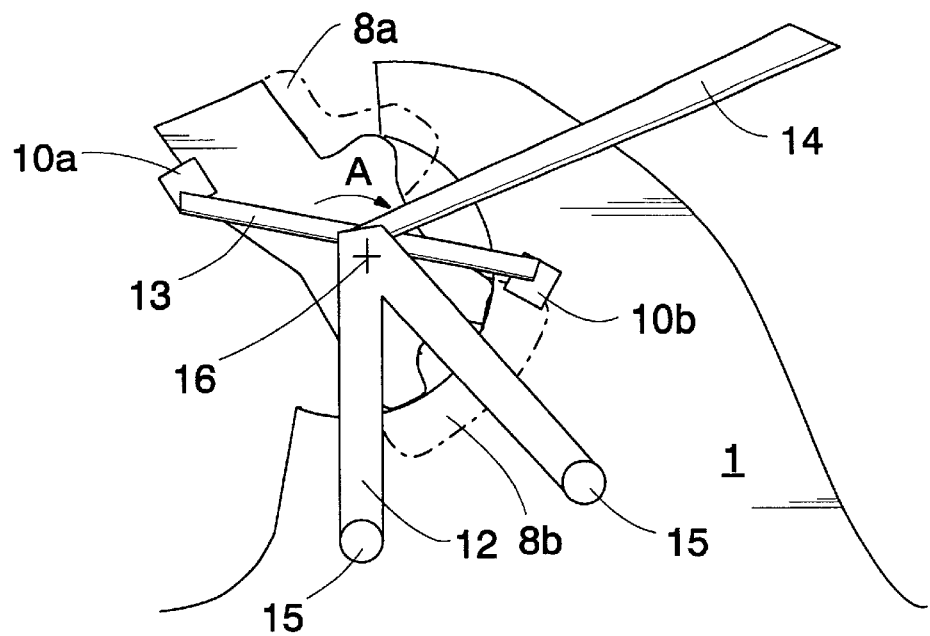
Figure 3:
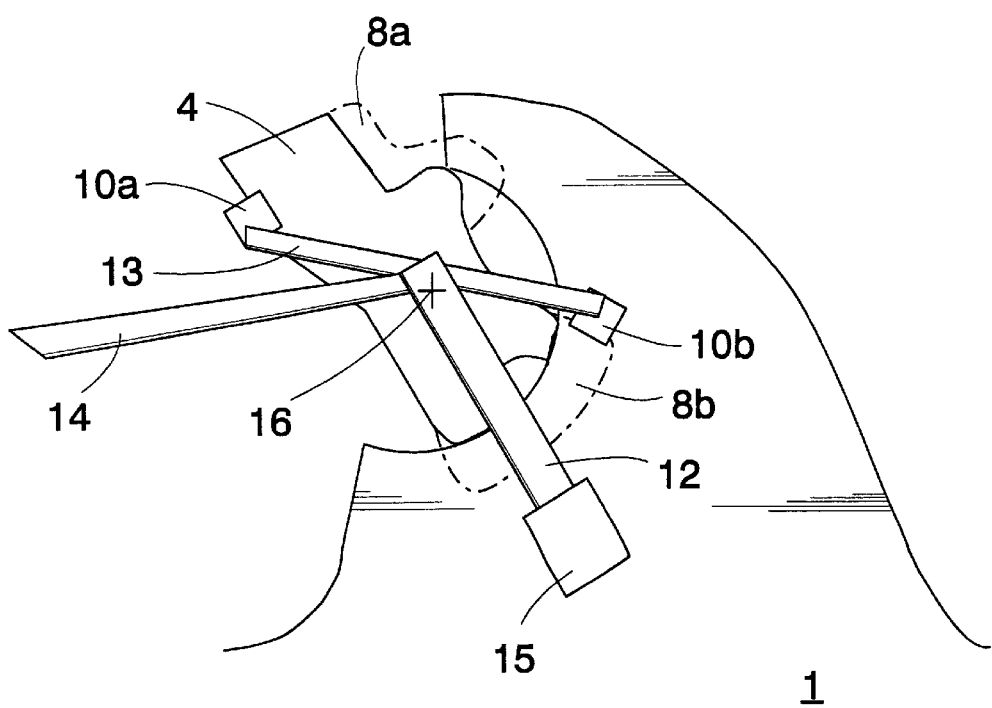
Figure 4:
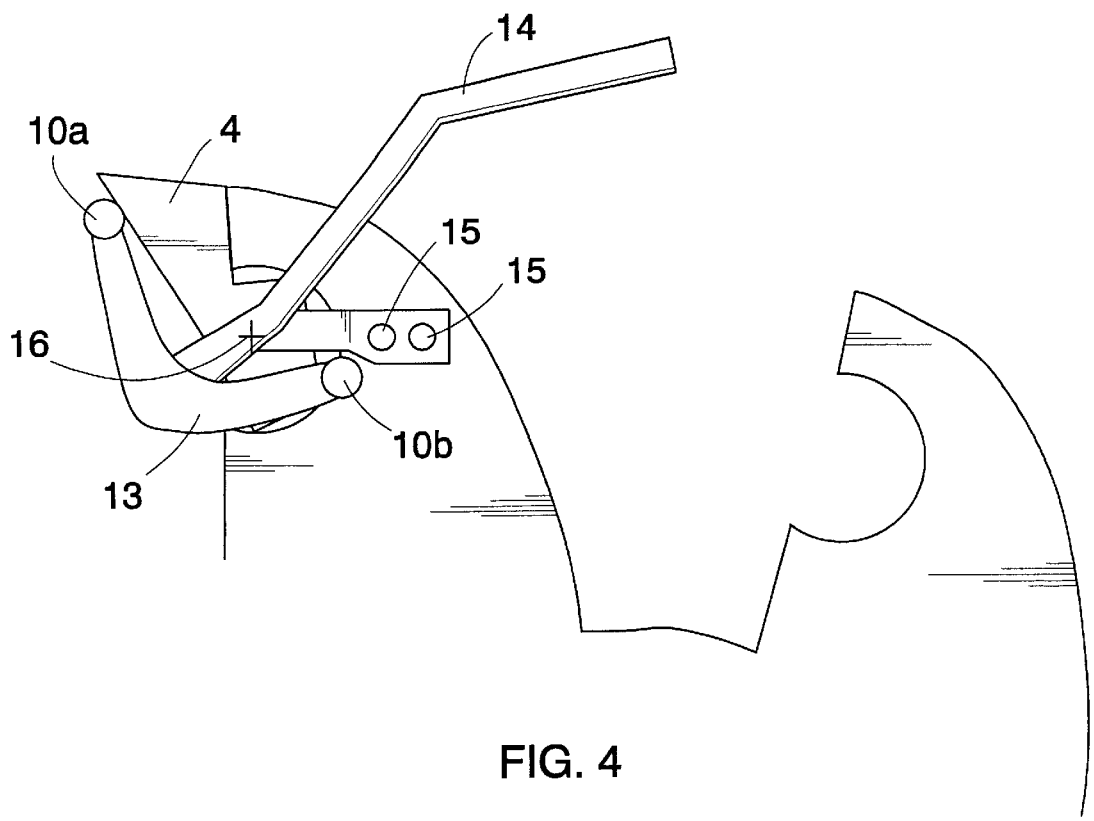
Figure 5:
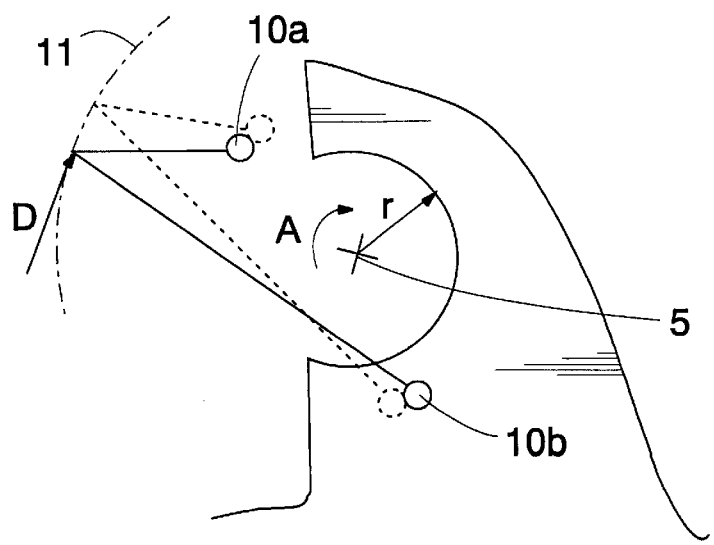
Figure 6:
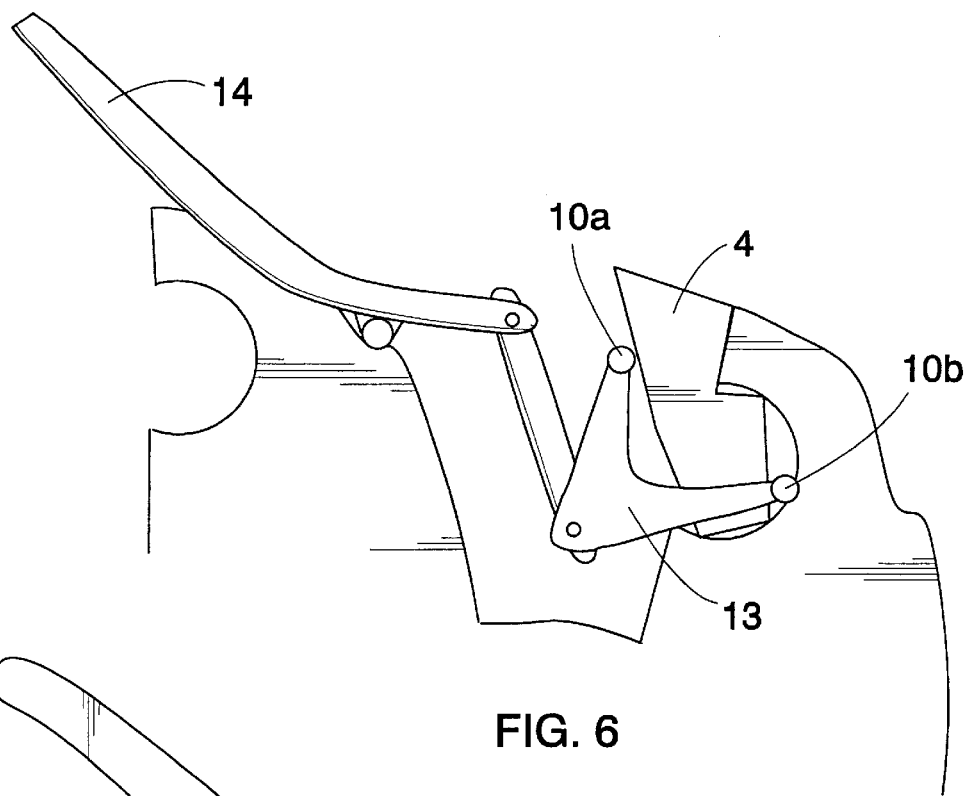
Figure 7:
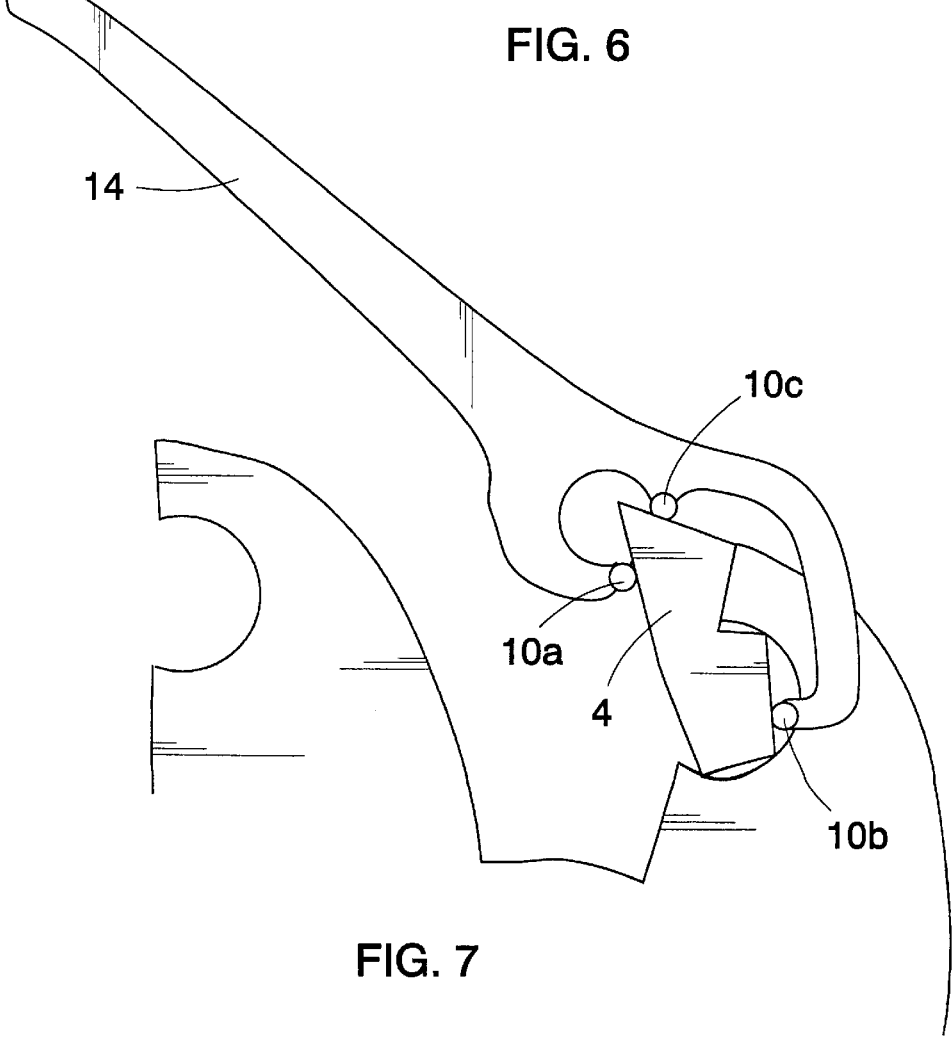
Figure 8:
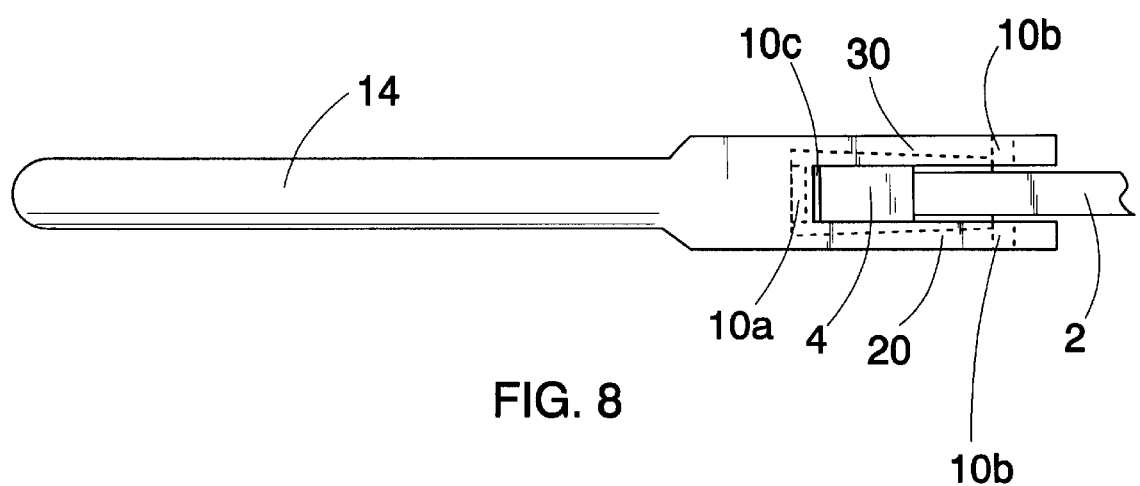

FIGS. 2 to 4 are schematic side views of some of the tools in accordance with the invention, FIG. 5 illustrates schematically one possible operating principle of the tool in accordance with the invention, FIGS. 6 and 7 are schematic views of yet some of the possible tool solutions in accordance with the invention, FIG. 8 is a top plan view of the tool, tooth bit and saw tooth, as illustrated in FIG. 7.

FIG. 1a shows a portion of the blade structure of a circular saw used in sawing wood. Saw teeth 2 and bit seats 3 for attaching shapelocked tooth bits 4 thereto are provided at the outer circumference of a blade body 1. Generally, the bit seat 3 is an unclosed circle in shape drawn around a center of rotation 5 as appears from the figure, but it may also deviate from this shape to some extent. The tooth bit is held in place by means of the shape of the tooth bit and the bit seat. When needed, a particular resilient portion 6, which facilitates tooth bit insertion, may be provided in the blade body. On the other hand, the resilient portion is not necessary, because the outermost portion of the tooth also yields to some extent and thus enables tooth bit insertion. There is interference fit between the tooth bit and the bit seat, i.e. the attachment portion of the tooth bit is made slightly larger than the bit seat, whereby the inserted tooth bit is subjected to constant pressure which holds the bit firmly in place. A mating surface 7 receives forces exerted in the rotational direction of the blade, and sideways the tooth bit is preferably supported by shoulders 8a and 8b provided in the tooth bit, illustrated with broken lines in the figure. The location and shape of the shoulders may deviate from those illustrated in the figures. The shoulders hold the tooth bit sideways in the correct position during use and insertion. The blade structure based on shapelocked bits and seats is obvious to the person skilled in the art and therefore it is not described in any greater detail herein.

FIG. 1b shows one principle of tooth bit insertion in accordance with the invention. In the figure, the broken line indicates a tooth bit 4' in its initial position before insertion, and correspondingly, the unbroken line indicates the tooth bit 4 turned into its proper position. Lines of dots and dashes indicate the shoulders 8a and 8b in the tooth bit 4', but for the sake of clarity they are omitted from the tooth bit 4 turned into its proper position. The tooth bit is first inserted into its seat 3 diagonally in such a way that its two lowermost supporting points 9a and 9b are against the seat's mounting surface, the third supporting point 9c still being outside the seat. The tooth bit 4' is then turned substantially with respect to the center of rotation 5 in the direction of arrow A into a position illustrated in the figure with the unbroken line, in which position the tooth bit 4 rests against the mating surface 7 and in which all three supporting points 9a to 9c of the tooth bit are firmly pressed against the circumference of the bit socket. Further, the reference numerals 10a and 10b in the figure show the insertion tool's upper and lower insertion heads respectively. The upper insertion head 10a is preferably arranged against the leading edge of the tooth bit and the lower insertion head 10b on the other side of the tooth bit against the shoulder 8b. These contact points are subjected to substantially tangential forces B and C of imagined circles 11a and 11b drawn around the center of rotation 5, whereby the tooth bits can be turned into position by the action of said forces with respect to the center of rotation 5 in direction A in the figure.

FIG. 2 shows one tool in accordance with the invention comprising at least a supporting means 12, turning means 13 and a turning arm 14. The tool is supported with the supporting means, for instance, to transverse apertures provided in the blade body 1 for the tool, or alternatively, the outer circumferential surface of the blade body can be utilized for providing supporting points. In the latter case, for instance a bottom between teeth, notches formed on the back edge of the saw tooth or any supporting point provided for the purpose can serve as the supporting point. The supporting means 12 of the tool in the figure comprises two branches, at the ends of which there are transverse pins 15 or the like, which fit into the apertures provided in the blade body when the tool is inserted into position from the side. The tool can also be supported to the apertures provided for tensioning the blade, or alternatively, to other apertures already existing in the blade body. The supporting means may also have a plate-like structure with corresponding pins arranged thereto. A pivot point 16 is provided in the supporting means substantially at the bit seat's center of rotation. At least the turning means 13, but preferably also the turning arm 14, are arranged to turn with respect to said pivot point 16. The apertures in the blade body, the branches of the supporting means and the location of the pivot point are arranged such that the turning means and therewith the tooth bit to be inserted can be rotated substantially with respect to the bit seat's center of rotation. Support prevents the pivot point from shifting with respect to the bit seat, and thus the turning means only conveys the correct rotational motion to the tooth bit. Hence, the hard but brittle tooth bit made of ceramic material, hard metal or the like is only subjected to forces which are substantial for insertion, and it is not broken by inappropriately directed insertion moves. The tool and its supporting points can be customized to each blade and blade type separately, or alternatively, the tool can be a general-purpose tool in which the pivot point can be adjusted by lengthening or shortening the branches of the supporting means or by shifting a fulcrum point. Thus the same tool can be used in connection with blades having different diameters, shapes and tooth spacings. Further, the branches of the turning means and their insertion heads 10a and 10b to be fitted against the tooth bit can be adjustable and thus tooth bits of various dimensions can be handled with the same tool. Furthermore, a means based on leverage for increasing the turning force can be arranged between the turning means and the turning arm. Of the insertion heads 10a and 10b of the turning means 13, at least the upper insertion head 10a to be fitted against the tooth bit's leading edge is preferably made of elastic material in order not to damage the tooth bit. To facilitate handling, means for holding the tooth bit in contact with the turning means during insertion are also preferably arranged in connection with the tool. Hence the tooth bit can be fitted into the tool prior to insertion, when the tool is not yet in contact with the blade and thus it is more easy to handle. Thereafter, the tool together with the tooth bit is fitted in the blade and the tooth bit is rotated into its seat. This kind of a tooth bit holder is particularly convenient, especially when inserting small tooth bits. The holder can be provided, for instance, by forming grooves in the insertion heads made of elastic material, into which grooves the tooth bit can be fitted and where it is held, pressed by the material. Alternatively, separate means pressing the tooth bit from the sides can be arranged in connection with the tool.

FIG. 3 shows a second embodiment of the tool in accordance with the invention. It is fairly similar to the tool of the preceding figure, with the exception that the supporting means 12 of this tool comprises only one branch at the end of which is arranged e.g. an angular pin 15 which can be inserted into an aperture of corresponding shape provided in the blade body. For instance, a pin having a square-shaped cross section prevents the tool's other movements than that allowing the turning means 13 to be turned about the pivot point 16. The turning arm 14 can be pivoted to the supporting means, and not to the turning means, whereby a force can be transmitted to the turning means with an appropriate link or the like. The position of the turning arm with respect to the turning means can be adjustable as well as the distance from the insertion head to the pivot point 16. It can be mentioned that said tool can also be used for detaching the tooth bits. Then the tooth bit is naturally turned in the opposite direction as compared with insertion.

FIG. 4 shows one possible structure of the tool. Also in this solution, the pivot point 16 is arranged at the center of rotation of the bit seat 3 by means of the supporting means 12.

FIG. 5 shows, in a highly simplified manner, yet another operating principle of the tool. The tool is not supported to the blade body 1, but its operation is based on the fact that the turning means 13 is turned with respect to the center of rotation 5 by exerting the turning force thereon, for instance, by means of an appropriate link mechanism in such a way that the force is exerted on the turning means 13 tangentially to an imagined circle 11 drawn around the center of rotation 5. In the figure, the initial position is illustrated with an unbroken line, while the turned position of the turning means is illustrated with a broken line. Force D is exerted on the turning means 13 tangentially to the circle 11.

FIG. 6 shows a tool based on a link mechanism. The turning means 13, which is a fork-like piece, is turned with respect to the bit seat by levering the turning arm 14. The turning arm is supported to a notch provided on the back edge of a preceding saw tooth. The force is transmitted from the turning arm to the turning means by means of an appropriate link mechanism. In addition, the tool can also bear against the sides of the blade in order not to slide sideways during insertion. It may further comprise a mechanism by which the force produced with the turning arm can be increased. Hence the mounting does not require considerable muscular power, and on the other hand, the turning arm can be shorter, whereby the tool is easier to use and carry about than previously.

FIG. 7 shows a tool which is not supported to the blade body separately. However, its operation is based on the idea of the invention, in which the tooth bit is turned by means of the insertion heads 10a and 10b which are on the opposite sides of the tooth bit. The figure further shows a third insertion head 10c which rests against the upper edge of the tooth bit. Furthermore, the insertion head 10b can be arranged on both sides of the saw tooth, in which case the tool body must be at least partly branched in order that a saw tooth fits between the branches. This tool is particularly firm, since it will not slide sideways.

The drawings and the description related thereto are only intended to illustrate the inventive idea. The details of the invention may vary within the scope of the accompanying claims. From the viewpoint of the inventive idea, the shape of the teeth and tooth bits is not significant, if only the tooth bit is shapelocked and it is lockable to the bit seat provided in the blade body by rotating the bit with respect to the bit seat. Apart from circular saw blades, the invention can also be applied to band saw blades, bow saw blades, hand saw blades and the like having a straight body. The tool may well comprise separate insertion heads, whereby the turning means comprises two separate parts. Further, for saw blade production, a separate tool can be provided, whose bearing against the center of rotation can also be arranged from outside the blade. The turning motion can then be performed, for instance, by means of a pressure medium cylinder. Furthermore, means for turning the blade to insertion position tooth by tooth can be arranged in connection with the tool.

What is claimed is:

1. A tool for attaching a shapelocked saw tooth bit having front and rear surfaces and opposite sides into a saw tooth bit seat formed in a tooth of a blade body of a saw and in which the tooth bit seat has a surface constituting a part of a circle formed from a center of rotation; said tool comprising two outwardly-extending arms having outer end portions and spaced-apart a predetermined distance from each other to be positioned on respective opposite sides of the tooth bit;

a first insertion head on said tool for engaging the front surface of the tooth bit and second insertion heads position respectively on said outer end portions of said two arms for engaging the rear surface of the tooth bit; said first and second insertion heads with the tooth bit engaged therebetween are arranged on said tool to rotate about the center of rotation of the tooth bit seat surface; and means for rotating the insertion heads for exerting a turning force on the tooth bit to rotate the tooth bit into the tooth bit seat.

2. A tool, as set forth in claim 1, in which said means for rotating said insertion heads comprises a turning arm connected to said insertion heads.

3. A tool, as set forth in claim 1, in which said tool further includes a third insertion head positioned on said tool for engaging an upper edge of the tooth bit.

* * * * *